United States Patent [19]

Hurst, Jr.

[11] Patent Number: 5,001,550
[45] Date of Patent: Mar. 19, 1991

[54] QUADRUPLEX ENCODER AND DECODER FOR EDTV SYSTEM

[75] Inventor: Robert N. Hurst, Jr., Hopewell, N.J.

[73] Assignee: General Electric Co., Princeton, N.J.

[21] Appl. No.: 420,031

[22] Filed: Oct. 16, 1989

[30] Foreign Application Priority Data

Nov. 11, 1988 [GB] United Kingdom ............... 8826467

[51] Int. Cl.$^5$ .......................................... H04N 11/14
[52] U.S. Cl. ...................................... 358/12; 358/141
[58] Field of Search .................... 358/12, 16, 30, 31, 358/140, 141, 142

[56] References Cited

U.S. PATENT DOCUMENTS

| | | | |
|---|---|---|---|
| 4,473,837 | 9/1984 | Tiemann | 358/12 |
| 4,701,783 | 10/1987 | Glenn | 358/12 |
| 4,855,824 | 8/1989 | Fuhrer | 358/12 |
| 4,884,127 | 11/1989 | Isnardi | 358/12 |
| 4,910,585 | 3/1990 | Smith | 358/12 |

FOREIGN PATENT DOCUMENTS 0103484  3/1984  European Pat. Off. .
268378  10/1989  Japan .

OTHER PUBLICATIONS

An Extended Definition Television System Quadrature Modulation of the Video Carrier with Inverse Nyquist Filter, by Yasumoto et al., IEEE Transactions on Consumer Electronics, vol. CE-33, No. 3, Aug. 1987, pp. 173 to 180.

"Decoding Issues in the ACTV System", M. A. Isnardi et al., IEEE Transactions on Consumer Electronics, vol. 34, Feb. 1988.

"Single Channel Backward-Compatible EDTV Systems", SMPTE Journal, Jan. 1989.

Primary Examiner—Tommy P. Chin
Attorney, Agent, or Firm—Joseph S. Tripoli; Eric P. Herrmann; Ronald H. Kurdyla

[57] ABSTRACT

By employing different independent polarity codes to polarity-modulate respective quads of averaged values in the vertical-temporal plane of luma, chroma, sidepanel and enhanced-luma components in the mid-frequency and/or high-frequency split-bands of a 4.2 MHz baseband television-type signal, the encoded components can be combined into successive composite quads of an encoded single channel, NTSC compatible, enhanced-definition 4.2 Mhz bandwidth television signal. The successive composite quads of the encoded signal can be decoded by a widescreen receiver without crosstalk taking place among the components, while such an encoded signal does not noticeably affect the display of a standard NTSC receiver.

39 Claims, 6 Drawing Sheets

QUADRUPLEX ENCODER

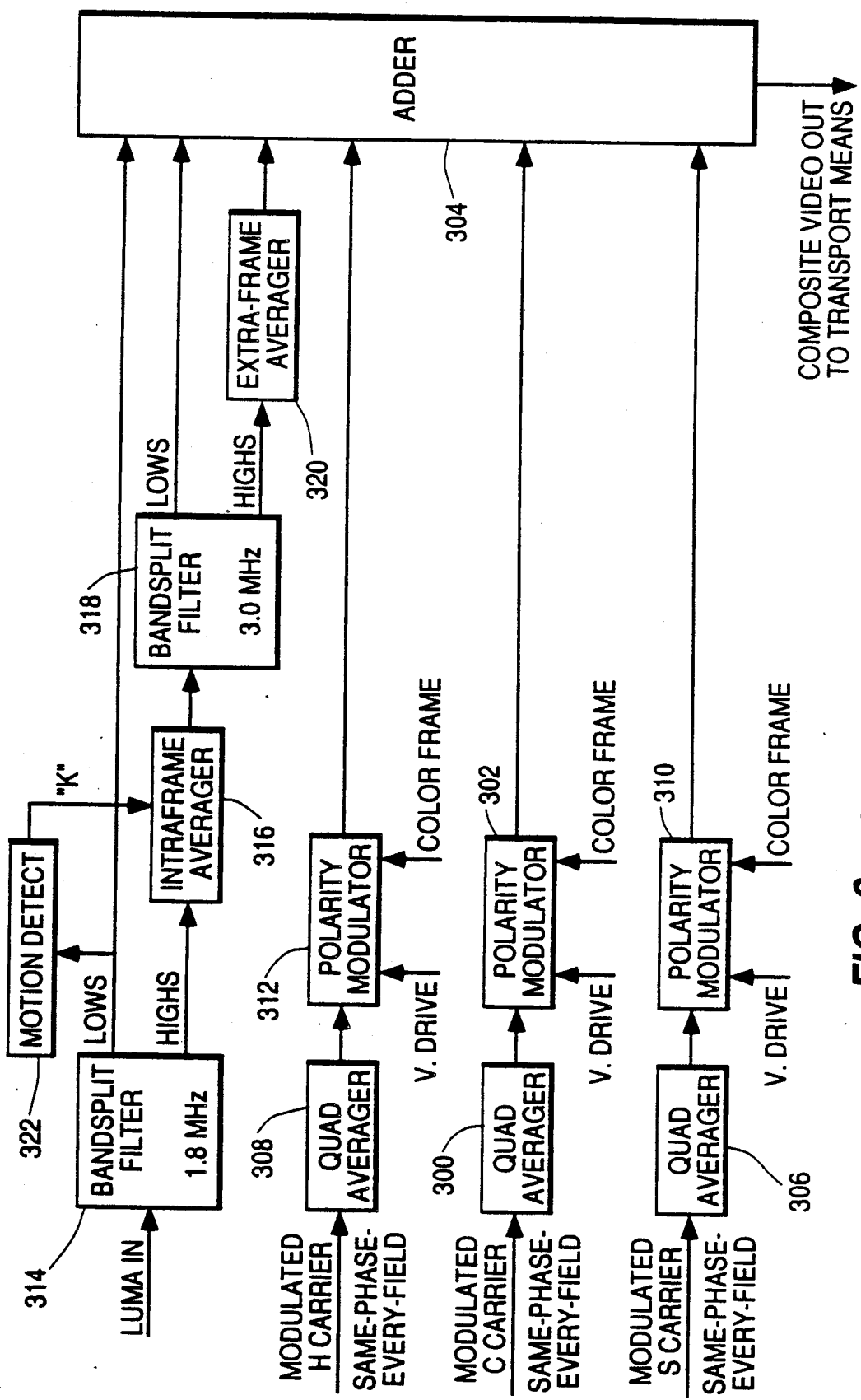
FIG. 3 QUADRUPLEX ENCODER

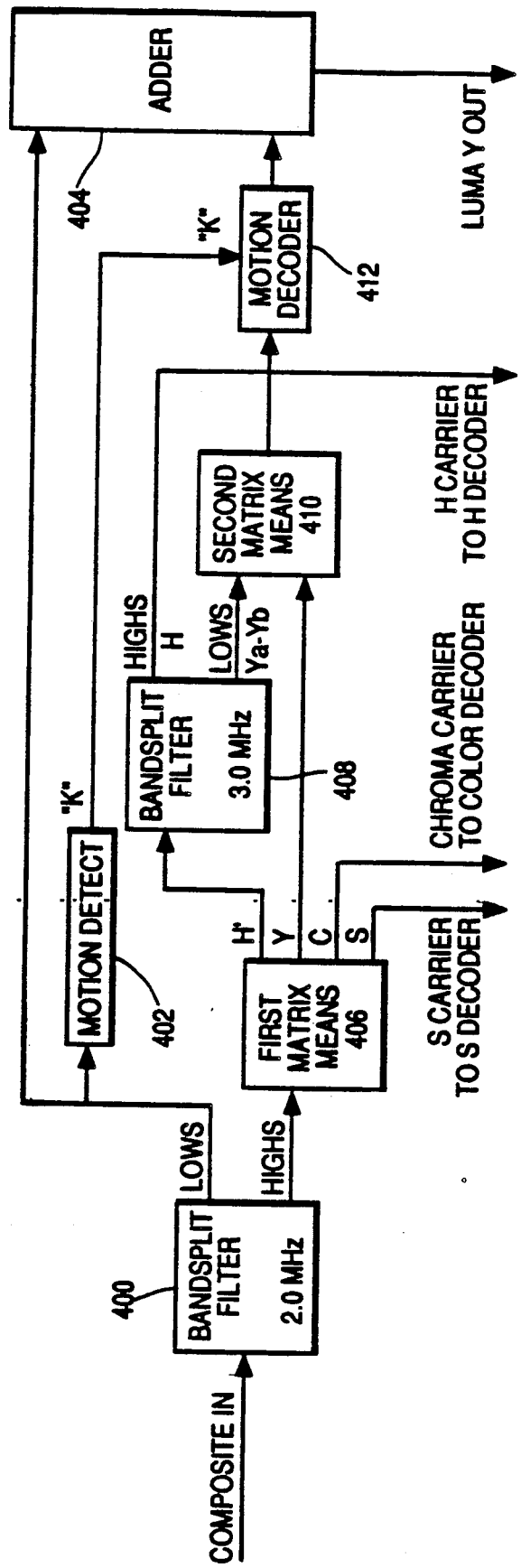
FIG. 4 QUADRUPLEX DECODER

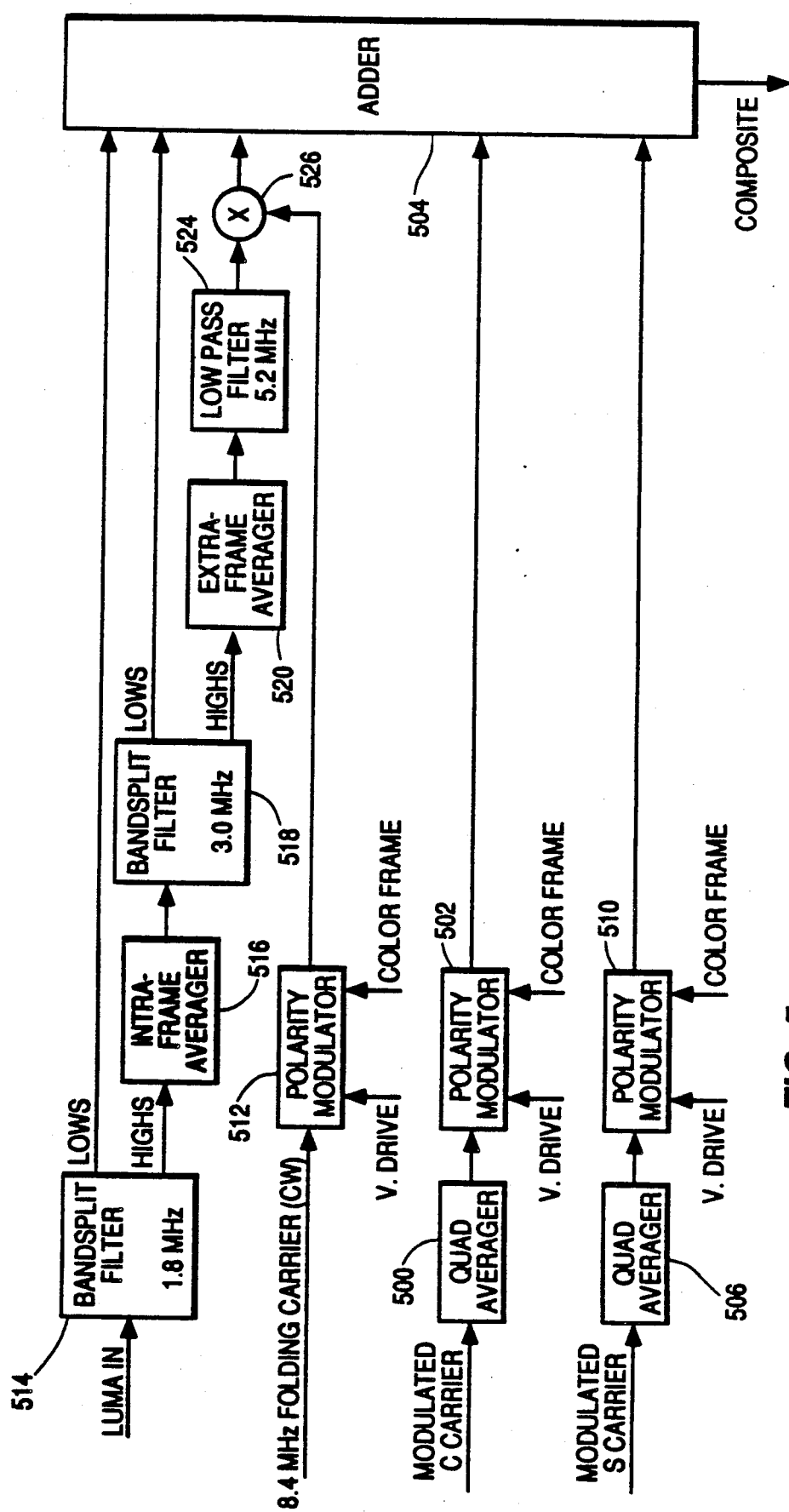
FIG. 5   QUADRUPLEX ENCODER

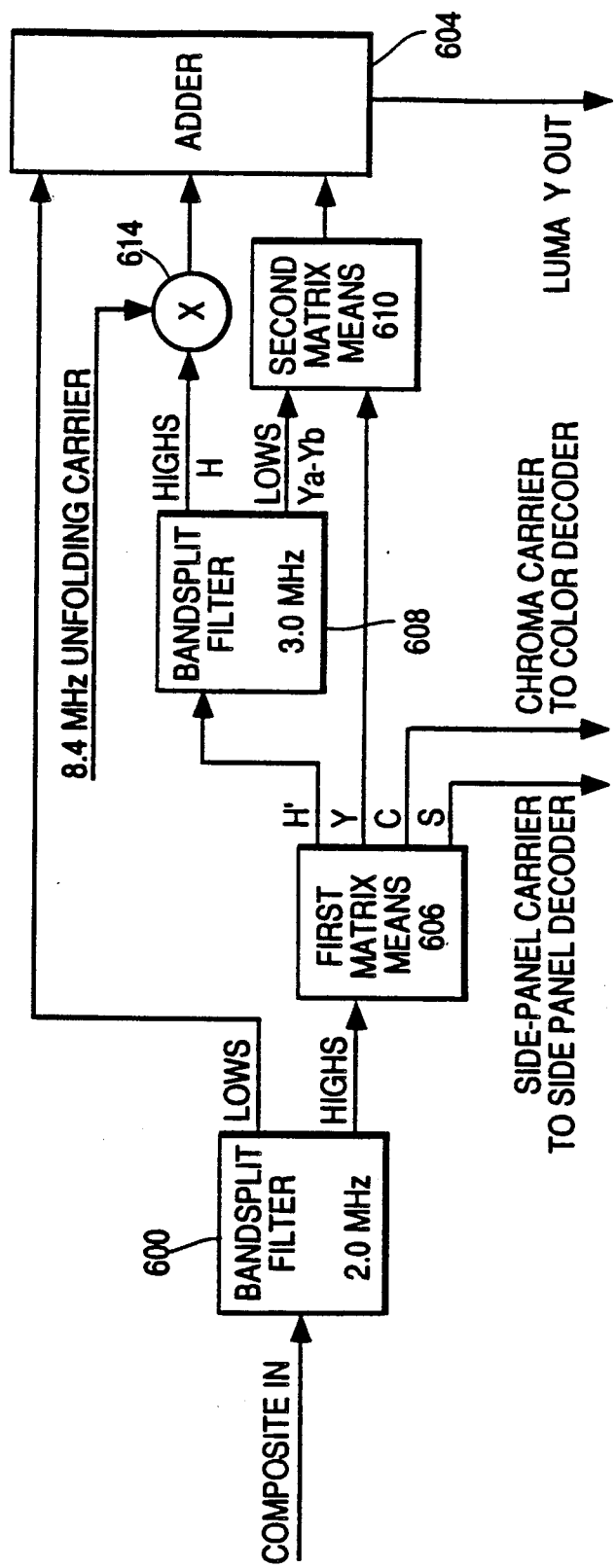

QUADRUPLEX ENCODER AND DECODER FOR EDTV SYSTEM

BACKGROUND OF THE INVENTION

This invention relates to encoders and to decoders for highly-correlated information signals and, more particularly, to such encoders and decoders for use in connection with a single channel, NTSC-compatible, widescreen enhanced-definition television (EDTV) system.

As is known, an original widescreen signal, comprised of a center panel and left and right sidepanels, has its center panel time-expanded and its left and right sidepanels time-compressed prior to such signal being broadcast as an NTSC compatible 4.2 MHz baseband signal to both widescreen receivers and standard NTSC receivers. When received by a widescreen receiver (i.e., one displaying a picture having an aspect ratio such as 2:1, 16:9 or 5:3), the time-expanded center panel is compressed to its original size and the time-compressed sidepanels are expanded to their original size before picture display takes place (thereby reproducing the entire original widescreen picture on the screen of the widescreen receiver). The use of signal compression techniques for the sidepanels of the picture takes advantage of the horizontal overscan region of a standard NTSC television receiver display, so that such a standard NTSC receiver displays only the time-expanded center panel on its standard 4:3 aspect ratio screen (the time-compressed sidepanels being hidden due to the horizontal overscan).

A single channel NTSC compatible, widescreen EDTV television signal includes more information than is normally included in a conventional NTSC 4.2 MHz baseband television signal. A conventional NTSC signal includes luma information in a frequency band up to 4.2 MHz and chroma information in a more limited band which modulates a 3.58 MHz sub-carrier. A single channel, NTSC compatible, widescreen EDTV signal includes both high-frequency luma information in a band above 4.2 MHz. and sidepanel information, in addition to the luma and chroma information of a conventional NTSC signal. Ideally, this additional information should be encoded in manner such that it can be decoded at a widescreen receiver without any crosstalk taking place between the different types of encoded information, and without causing any degradation of the picture displayed by a standard NTSC receiver due to the presence of such encoded information.

Reference is now made to co-pending application Ser. No. 07/139,338, filed Dec. 29, 1987 by Isnardi et al., and assigned to the same assignee as the present application. This application discloses a single channel, NTSC compatible, widescreen EDTV system in which the original widescreen signal is comprised of high-frequency luma and sidepanel components, in addition to a main component comprised of the time-expanded center panel and time-compressed sidepanel low frequencies. Each of these three components is separately intraframe averaged. Intraframe averaging involves averaging the pixels values of each pair of neighboring image pixels in the vertical-temporal plane defined by the two interlaced fields of each NTSC frame. Such intraframe averaging significantly reduces the image data that need be transmitted, without introducing any significant error, since the image data defined by such a pair of neighboring pixels is almost nearly always highly correlated in any single frame. The intraframe-averaged high-frequency sidepanel and luma components quadrature-modulate a sub-carrier, which quadrature-modulated sub-carrier is then added to the intraframe-averaged main component, thereby providing an NTSC compatible 4.2 MHz baseband signal.

The use in the Isnardi et al. application of intraframe averaging allows perfect separation (i.e., no crosstalk) in the vertical-temporal plane of the main component and each of the two quadrature-modulated components by the decoder in the widescreen receiver. However, the main component in Isnardi et al. includes both the luma and chroma portions of a standard NTSC signal. Intraframe averaging does not allow for separation of luma and chroma in the widescreen receiver. They need to be separated therein by some other means, such as by linear, time-invariant, vertical-temporal filtering of luma and chroma. If such filters were ideal, no crosstalk would take place. However, in practice, no such filter is ideal. Therefore, significant unwanted crosstalk does take place between the luma and chroma portions of the main component and the other additional information components. Furthermore, luma, time-invariant, vertical-temporal filtering and intraframe averaging do not co-exist synergistically: they tend to fight each other. Furthermore, as single channel, NTSC compatible, widescreen EDTV system development continues, it becomes apparent that more and more additional information components need be included in the television signal transmitted to both widescreen receivers and standard NTSC receivers. This means that the information contained in the luma and chroma must be reduced even more than it is reduced by intraframe averaging, but still without any great detriment to the picture displayed by either the widescreen receiver or by the standard NTSC receiver. The quadruplex encoding and decoding technique of the present invention permits a single channel, NTSC compatible, widescreen EDTV system to transmit a large number of information components, including both luma and chroma, to both widescreen and standard NTSC receivers in a manner which permits the information to be separated into its various components by the decoder of each widescreen receiver without any significant amount of crosstalk between the various information components taking place, and without any significant degradation of the picture quality displayed by standard NTSC receivers.

SUMMARY OF THE INVENTION

From a broad point of view, the quadruplex encoder the present invention operates on four separate series, in which each series is comprised of successive independent values of a parameter. The parameter represented by any one series may be different from the respective parameters represented by each of the other three series or, alternatively, they may represent the same parameter as one or more of the other three series. In any case, each of the four series is polarity-modulated by a different predetermined polarity code that permit the four polarity-modulated series to be combined into a single signal that can be later separated back into the original four series by the quadruplex decoder of the present invention.

While not limited thereto, the quadruplex encoder and quadruplex decoder of the present invention are particularly suitable for use in a single channel, NTSC compatible, widescreen EDTV system because one of the four different predetermined polarity codes corresponds to the polarity coding of chroma inherent in the NTSC standard.

More specifically, the present invention is directed to a quadruplex encoder for multiplexing components of a televisiontype signal that includes a luma component, a chroma component, and at least one additional component. The encoder comprises first means for converting the signal into successive sets of four ordinally-arranged information quads, each of the quads being comprised of up to four separate values including a single chroma component value, at least one luma component value, and one value for each additional component included in a quad. The encoder comprises second means for polarity-modulating the respective values of chroma the component of the four ordinally-arranged quads of each successive set with a first specified one of the following three polarity codes which have relative polarities of (a) + + − − or, alternatively, − − + +, (b) + − − + or, alternatively, − + + −, and (c) + − + − or, alternatively, − + − +, respectively. The quadruplex encoder further comprises third means for polarity-modulating the respective values of the one additional component of four ordinally-arranged quads of each successive set with the second specified one of the three codes (a), (b) and (c), respectively. The respective values of the luma component of the four ordinally-arranged quads of each successive set all have the same polarity, whereby, in effect, the respective values of the one luma component are polarity-modulated with a fourth polarity code having a relative polarity of (d) + + + + or, alternatively, − − − −. Finally, the quadruplex encoder comprises fourth means for separately summing, in order, the polarity-modulated values of luma, chroma, and additional components included in the quads of the respective first, second, third and fourth of the four ordinally-arranged quads of each successive set, thereby deriving successive composite quads each of which is comprised of the resulting respective four ordinally-arranged summation values of that set.

The present invention is also directed to a quadruplex decoder for demultiplexing successive encoded composite quads supplied thereto. The quadruplex decoder comprises first means including at least one matrix means responsive to each of the successive composite quads supplied thereto for resolving the four values of a composite quad into the components thereof. The matrix means derives up to four separate outputs, the separate outputs including at least outputs substantially proportional to the value of that composite quad's chroma component, an output substantially proportional to the value of that composite quad's one additional component, and an output substantially proportional to one value of that composite quad's luma component. The decoder further comprises second means for supplying successive composite quads to the first means.

One important advantage of the quadruplex encoding and decoding technique employed by the present invention is that it substantially avoids crosstalk among the multiplexed components from taking place.

BRIEF DESCRIPTION OF THE DRAWING

FIG. 3 is block diagram of a first embodiment of a quadruplex encoder incorporating the present invention;

FIG. 4 is a block diagram for a quadruplex decoder incorporating the present invention which cooperates with the quadruplex encoder of FIG. 3;

FIG. 5 is a block diagram of a second embodiment of a quadruplex encoder which incorporates the present invention; and FIG. 6 is a block diagram of a quadruplex decoder incorporating the present invention which cooperates with the quadruplex encoder of FIG. 5.

DESCRIPTION OF THE PREFERRED EMBODIMENTS

Figure 1:
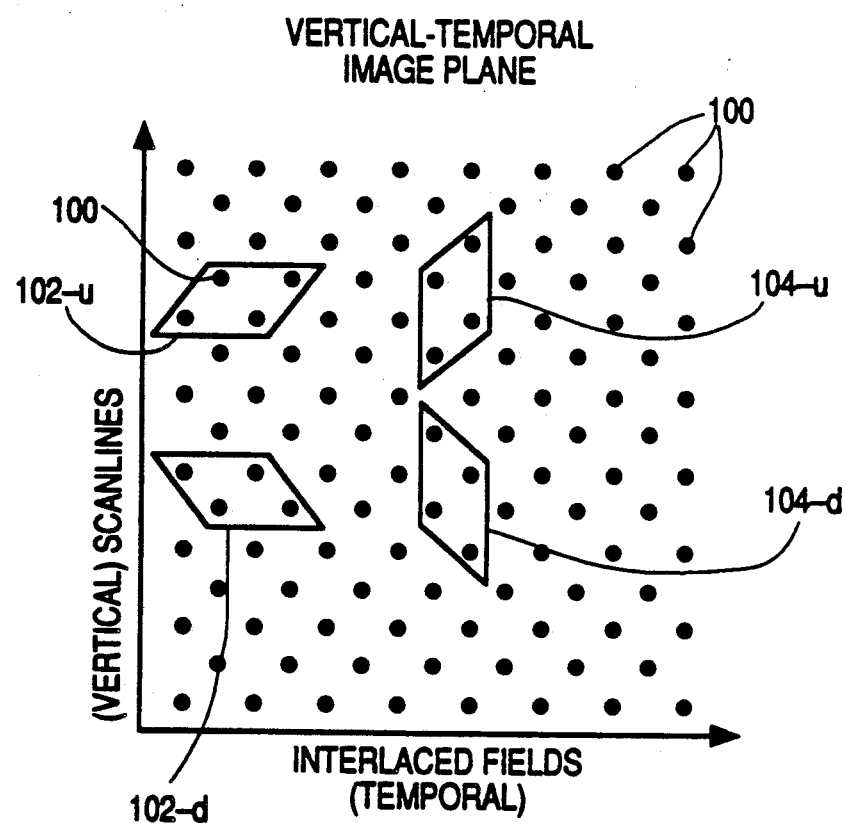
FIG. 1 is a diagrammatic showing of different ways in which four correlated image values of the vertical-temporal image plane of a television-type signal (e.g., an NTSC television signal) comprised of interlaced television fields may be organized into information quads.

FIG. 1 diagrammatically illustrates a vertical-temporal image plane of a television-type signal in which the occurrence of successive scan lines in the vertical image dimension are plotted against the occurrence of successive interlaced television fields in the temporal dimension. Thus, in FIG. 1, the horizontal image dimension of each scan line is in a direction into the paper. It will be noted that the occurrence of image information in the vertical-temporal plane is digital in nature (i.e. both the scan lines in the vertical dimension and the interlaced fields in the temporal dimension occur as image sample values that are discrete and countable). However, at the present time, successive image values in the horizontal dimension occur in analog form, rather than in digital form. While the principle of the present invention could be applied to image information in analog form, it is not practical to do so. It is for this reason that the following description of the present invention is confined to the vertical-temporal plane. However, it should be understood that if in the future a completely digital television signal becomes the standard, it would be then practical to employ the present invention with digital sampled image values in the horizontal-vertical image plane, as well as in the vertical-temporal image plane.

FIG. 1 shows various ways in which image values 100 in the vertical-temporal image plane can be organized into information quads, each of which is made up of four adjacent image values 100 in the vertical-temporal image plane. Because they are adjacent, there is an extremely high probability that image information contained in each of the four image values of the quad are highly correlated with one another. An exception would be the relatively rare case in which an edge intersects a particular quad. Specifically, as shown in FIG. 1, the image values 100 of the vertical-temporal image plane may be organized into four different shapes of quads. A first and second of the four different shape quads are comprised of quad 102-$u$ and 102-$d$, each of which is comprised of scan lines from each of four consecutive interlaced fields. The shape of quad 102-$u$ is designated an up-quad, while the shape of 102-$d$ is designated a down-quad. Similarly, quad 104-$u$ is designated an up-quad and 104-$d$ is designated a down-quad. However, quads 104-$u$ and 104-$d$ are each comprised of two consecutive scan lines from each pair of two consecutive interlaced fields. In practice, the vertical-temporal image plane of image value 100 is organized into a set of successive information quads of the same preselected one of the four types of quads shown in FIG. 1.

Figure 2:
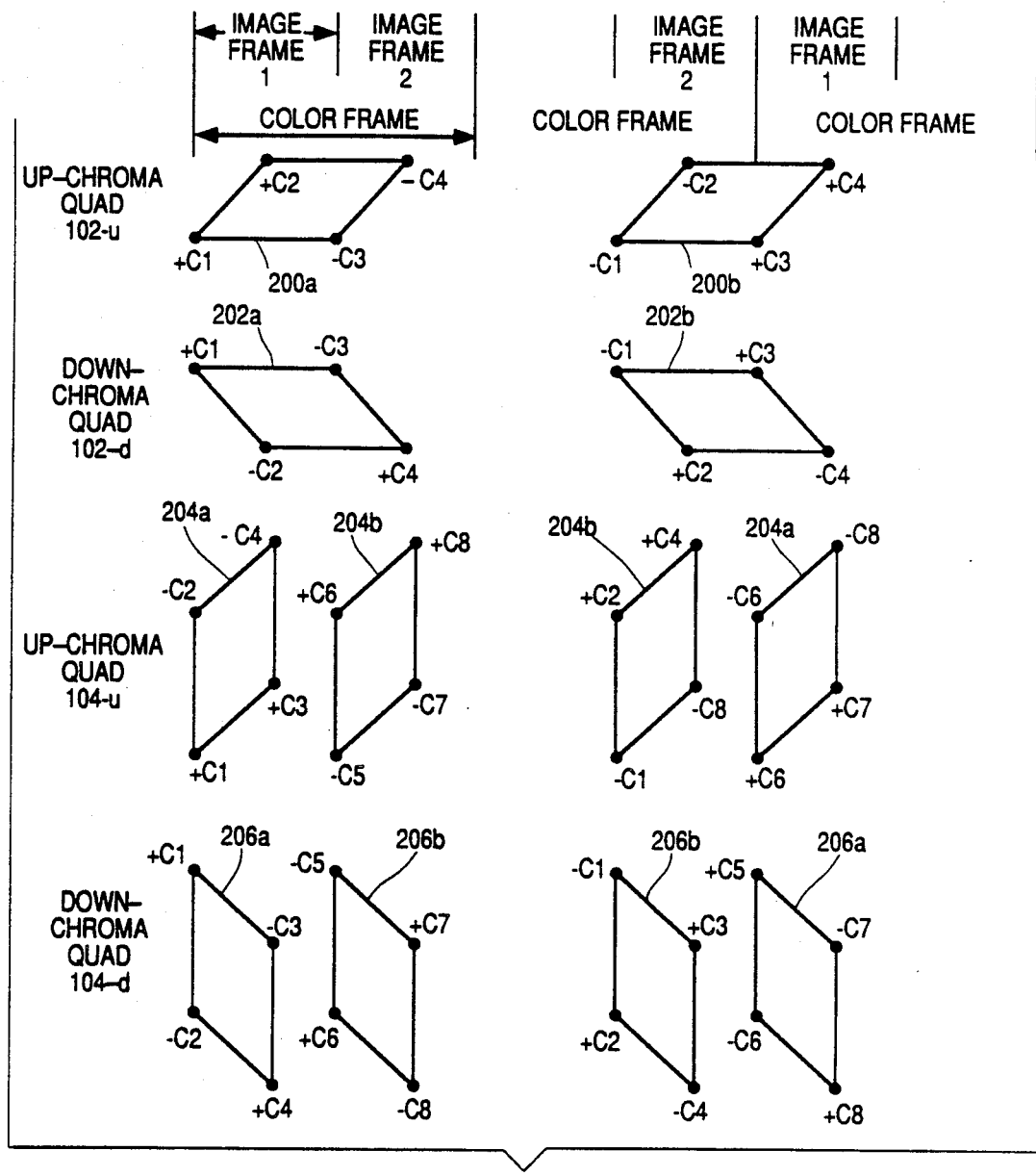
FIG. 2 illustrates the relative polarity of the four correlated image values of the chroma component of an NTSC television signal for each of various organizations of information quads in the vertical-temporal image plane.

As known, television conforming to the NTSC standard is comprised of successive color frames, each of which color frames is made up of two consecutive image frames and each of the two image frames is made up of two consecutive interlaced fields. In an NTSC signal, the relative polarity of all image values of the luma component is the same, but the relative polarity of the image values of the chroma component (i.e., the modulated color-carrier) varies during a color frame in a predetermined manner. FIG. 2 shows how the relative polarity of the image value of a chroma-component quad varies in accordance with (1) the predetermined shape of the quad and (2) the relative position of the quad with respect to the beginning of a color frame.

Up-chroma quad 102-$u$ may be positioned in alignment with image frames 1 and 2 of the same color frame (as indicated by quad 200$a$) or, alternatively, up-chroma 102-$u$ may be positioned in alignment with image frames 2 of one color frame and image frame 1 of the immediately following color frame (as indicated by 200$b$). In a similar manner, down-chroma quad 102-$d$ may be aligned either like quad 200$a$ or like 200$b$.(as indicated by quads 202$a$ and 202$b$, respectively)

In the case of up-chroma quad 102-$u$, the relative polarity code of the four chroma values C1 C4 is $++--$ (for quad 200$a$) or, alternatively, $--++$ (for quad 200$b$). In the case of down chroma quad 102-$d$, the relative polarity code is $+--+$ (for quad 202$a$) or, alternatively, $-++-$ (for quad 202$b$). The polarity codes for 200$a$ and 200$b$ are not independent, since one is merely the inverted form of the other. For the same reason, polarity codes 202$a$ and 202$b$ are not independent. However, the polarity code for either quad 200$a$ or 200$b$ is independent of the polarity code for either quad 202$a$ or 200$b$. Further, aligning the beginning of an up-chroma quad 102-$u$ with the second field of either the first or second image frame of a color frame results in up-chroma quad 102-$u$ exhibiting one of the non-independent polarity codes $+--+$ or $-++-$. Should the beginning of a down-chroma quad 102-$d$ be aligned with the second field of image frame 1 or 2 of a color frame, the resulting polarity code is either $--++$ or $++--$. Thus, the only effect of aligning the beginning of a chroma quad with the second field of an image frame, rather than a first field of an image frame, is to interchange the polarity codes employed by the respective up and down chroma quads 102-$u$ and 102-$d$.

Each of chroma quads 104-$u$ and 104-$d$ occupies only an image frame, rather than an entire chroma frame. Thus, there are two successive chroma quads 104 during each color frame. In the respective image frames 1 and 2, up-chroma quad 104-$u$ has each of the two alternative non-independent polarity codes $+-+-$ (quad 204$a$) and $-+-+$ (quad 204$b$). Down-chroma quad 104-$d$ has each of the respective alternative non- independent polarity codes $+--+$ (quad 206$a$) and $-++-$. Should any of chroma quads 104 begin on the second field of either image frame 1 or 2 of a color frame, the result would be to interchange the above-described relative polarity codes for up and down chroma quads 104-$u$ and 104-$d$, respectively.

The following four polarity codes are independent of one another:

(a) $++--$ or, alternatively, $--++$;
(b) $+--+$ or, alternatively, $-++-$;
(c) $+-+-$ or, alternatively, $-+-+$;
(d) $++++$ or, alternatively, $----$.

From the foregoing discussion, it is apparent from the above discussion that a chroma quad of an NTSC signal always conforms to a certain specified one of polarity codes (a), (b), and (c). It is also apparent that a luma quad, corresponding in shape to a chroma quad, conforms to polarity code (d). Which one of polarity codes (a), (b) and (c) is the specified certain one depends on whether the shape the chroma quad conforms to that of up-chroma quad 102-$u$, down-chroma quad 102-$d$, up-chroma quad 104-$u$ or down-chroma quad 104-$d$, and also depends on whether this chroma quad begins in the first, second, third or fourth of the four consecutive fields of a color frame. However, in any event, there will always remain two independent ones of polarity codes (a), (b) and (c), other than the aforesaid certain specified one thereof, which can used to encode up to two additional components of a television-type signal.

More specifically, the present invention makes use of the aforesaid four independent polarity codes in a single channel, NTSC compatible, widescreen enchanced-definition television system, such as the type of system disclosed in the aforesaid co-pending Isnardi et al. application. In such a system, an NTSC compatible 4.2 MHz baseband signal is derived which includes luma and chroma information in NTSC standard form, and also includes additional widescreen side panel information and additional chroma information and additional high frequency and additional high-frequency luma information above 4.2 MHz. As discussed above, these two additional components must be incorporated into the 4.2 MHz baseband signal in such a manner that these additional components will be substantially unnoticeable to a viewer of a displayed television picture on a standard NTSC receiver receiving the aforesaid 4.2 MHz baseband signal, although they can be decoded and used by a widescreen enhanced definition receiver.

Referring now into FIG. 3, there is shown a block diagram of one species of a quadruplex encoder embodying the present invention for use in a single channel, NTSC compatible, widescreen enhanced-definition television system. For illustrative purposes, it is assumed that quads conforming in shape and color-frame alignment to either up-chroma quad 200$a$ or down-chroma quad 202$a$ are utilized by the encoder of FIG. 3. Further, while an NTSC compatible signal transmitted to receiver is an analog signal, the respective blocks of quadruplex encoder of FIG. 3 may be implemented in digital form, in which case a digital-to-analog converter may be utilized to change the signal to analog form prior to its transmission to a receiver.

As shown in FIG. 3, four separate information components (comprised of a luma component Y, an enhanced-information modulated H carrier component, a chroma modulated C carrier component, and a sidepanel modulated S carrier component) are applied as inputs to the quadruplex encoder. Specifically, the modulated C carrier is applied as an input to quad averager 300, which averages the four correlated image values of each successive chroma quad. Were the modulated C carrier applied as an input to quad averager 300 in conformity with the NTSC polarity standards (shown by the chroma quads of FIG. 2), the average value would always be substantially zero because two of the four fields of a color frame are of positive polarity and two of the fields are of negative.polarity. In order to prevent this, the modulated C carrier input to quad averager 300 has the same phase every field (i.e., each successive quad of the input has polarity code (d), rather than some certain one of polarity codes (a), (b) and (c) in accordance with NTSC chroma standards).

Quad averager 300 includes memory or delay means and summing means for deriving an output chroma quad in which all four chroma values thereof are the same given proportion of the mean average of th four correlated chroma image values in the vertical-temporal plane of each successive input chroma quad. Thus, all four values of an output chroma quad from quad averager 300 are the same as one another. Each of the successive output chroma quads from quad averager 300 are applied as an input to polarity-modulator 302. Polarity modulator 302 includes a switch responsive to a polarity-pattern pulse for either inverting or not inverting the polarity of each chroma value applied as an input thereto. The polarity-pattern pulse is generated by a counter and appropriate gates, which counter is clocked at the field rate and is reset at the color frame rate. Thus, each successive counter cycle is comprised of four successive fields. If the chroma quad should conform to up-chroma quad 200a, polarity-modulator 302 modulates each successive chroma with polarity code (a). If the chroma should conform to down chroma 202a, polarity 302 modulates each successive chroma quad with polarity code (b). The successive polarity-modulated chroma quads are applied as a seperate input to adder means 204.

The successive sidepanel quads which are applied as an input to quad averager 306 and the successive enhanced-luma quads which are applied as an input to quad averager 308 correspond with the successive chroma quads applied as an input to quad averager 300. Further, quad averagers 306 and 308 are generally similar to quad averager 300 and polarity-modulators 310 and 312 are generally similar to polarity-modulator 302. However, polarity-modulator 310 polarity-modulates the four mean average values of each successive sidepanel quad from quad averager 306 with a first specified one of polarity code (a), (b) and (c) other than the polarity code employed by chroma polarity-modulator 302. In a similar manner, polarity-modulator 312 polarity-modulates the four mean average values of each successive enhanced-luma quad from quad averager 308 with the remaining one of polarity codes (a), (b) and (c) that is not employed by either polarity-modulators 302 or 310. The respective outputs of polarity-modulators 310 and 312 are applied as separate inputs to adder means 304.

The luma input is split into first and second frequencies respectively below and above 1.8 MHz by bandsplit filter 314. The first band below 1.8 MHz is applied as a separate input to adder means 304. The second band, after being intra-framed averaged by intra-frame averager 316, is split into third and fourth bands respectively above and below 3.0 MHz by bandsplit filter 318. The third band, which comprises frequencies between 1.8 and 3.0 MHz, is applied a separate input to adder means 304. The fourth band above 3.8 MHz, after being extra-framed averaged by extra-frame averager 320, is applied as a separate input to adder means 302.

Intra-framed averagers, which are disclosed in the aforesaid co-pending Isnardi et al. application, average the two values in each image frame. This average may be a mean average of the two correlated image values of the two interlaced fields of each image frame. However, preferably the intra-frame average should be weighted in accordance with detected image motion in the temporal dimension. More specifically, in FIG. 3, motion detector 322, which is responsive to the respective first-band luma values in each successive low-frequency luma quad, computes the value of a motion-indicating factor K which controls the weighting of intra-framed averager 316 in a manner to be discussed in more detail below. Extra-frame averaging consists of averaging the correlated image values of the first field and of the second fields. respectively, of the two successive image frames making up a color.frame. Thus, the combined effect of intraframed averager 316 and extra-framed averager 320 on the luma quad of the first frequency band is equivalent to that of a quad averager. If desired, one could move intra-frame averager 316 into the third frequency band and substitute a quad averager for extra-frame averager 320 in the fourth frequency band without affecting the operation of the quadruplex encoder. However, this is undesirable because a quad averager operating in the vertical-temporal plane requires substantially more memory than does an extra-frame operating in the vertical-temporal.

The video output from adder means 304 is an NTSC compatible 4.2 MHz baseband signal comprised of successive composite quads of image information.

In the following discussion of the operation of the quadruplex encoder shown in FIG. 3, it is assumed that the luma input is a 4.2 MHz baseband signal; the spectrum of the modulated C carrier, which is comprised of a 1.5 MHz in-phase component" and a 0.5 MHz quadrature-phase component, lies entirely in a band between 1.8 and 4.2 MHz; the 2.0 MHz bandwidth spectrum of the modulated S carrier also lies entirely in a band between 1.8 and 4.2 MHz; and the 1.0 MHz bandwidth spectrum of the modulated H carrier, which defines enhanced luma information between 4.2 and 5.2 MHz, lies in a band between 3.0 and 4.2 MHz. It is further assumed that intra-frame averager 316 can read out from memory each of the two intra-frame averaged luma values, computed for each of the two consecutive image frames of a color frame, in any one or more of the four ordinally-arranged quad positions of each successive luma quad input to bandsplit filter 318. It is first assumed that the vertical-temporal plane has been organized into up-chroma quads 200a, so that the C component is polarity-modulated with polarity code (a); that polarity code (b) is specified for the S component and polarity code (c) is specified for the H component. In accordance with this first assumption, the following equations define the respective four values L1, L2, L3 and L4 of each successive ordinally-arranged composite quad output from adder means 304 for the high-frequency band above 3.0 MHz, for the mid-frequency band between 1.8 and 3.0 MHz, and for the low-frequency band below 1.8 MHz, respectively. More specifically, the equations for the high-frequency band are:

$$L1 = Y + C + S + H$$

$$L2 = +C - S - H$$

$$L3 = Y - C - S + H$$

$$L4 = Y - C + S - H$$

where Y, C, S and H are the quad-averaged values of each of these respective components employed for each successive composite quad.

The equations for the mid frequency band are:

$L1 = Ya + C + S$ $L2 = Yb + C - S$ $L3 = Ya - C - S$ $L4 = Yb - C + S$ where Ya and Yb, respectively, are the computed averages by intra-frame averager 316 for the first and second image frames of a color frame, respectively. The H component does not appear in the mid-frequency band equations because its frequency spectrum is confined solely to the high-frequency band.

The equations for the low-frequency band are:

$L1 = Y1$ $L2 = Y2$ $L3 = Y3$ $L4 = Y4$ where Y1, Y2, Y3 and Y4 are the four independent ordinally-arranged values of the luma component Y in the low-frequency band. The C and S components do not appear in the low band equations because the frequency spectra thereof are confined solely to the mid-frequency and high-frequency bands.

In each of the high-frequency, mid-frequency, and low-frequency bands the set of the four equations L1, L2, L3 and L4 are independent of one another. This independence makes it possible to separate the luma Y, chroma C, sidepanel S and enhanced-luma H components from one another without any crosstalk therebetween by the quadruplex decoder incorporated in a widescreen enhanced-definition television receiver, while permitting a standard NTSC receiver to properly display the luma and chroma components. In this regard, the fact that the mid-frequency band is comprised of only three of the four components and contains two independent values of the luma places certain constraints on the set of equations for the up-quad pattern (i.e., in which chroma component C must be polarity-modulated with polarity code (a) ). First, it is essential that each of the two independent luma component values Ya and Yb be associated with both of opposite-polarity chroma component values C in order that NTSC compatibility be achieved. Second, in order to attain independence, it is essential that the respective polarities of both chroma C and sidepanel S components associated with one of the Ya luma component values be opposite to the polarities of the chroma C and sidepanel S components associated with the other Ya luma component value (and similarly for the Yb luma component values). In order to meet this latter constraint for the up-quad pattern the sidepanel component must be polarity-modulated by polarity code (c), as was assumed above. Thus, the set of equations for L1, L2, L3 and L4 set forth above for the up-quad pattern is the only set of equations that can be employed for the up-quad pattern.

In a down-quad pattern, the chroma component must be polarity modulated by polarity code (b), as indicated by down-chroma quad 202a, in order to conform to the NTSC standard. Polarity modulating the chroma quad with polarity code (b) permits two different sets of equations for L1, L2 L3, and L4, both of which conform to the above-discussed constraints on the set of equations for the mid-frequency band.

In a first of these two sets of equations, the respective values of L1, L2, L3 and L4 for the mid-frequency band are:

$L1 = Ya + C + S$ $L2 = Yb - C + S$ $L3 = Ya - C - S$ $L4 = Yb + C - S$

Therefore, L1, L2, L3 and L4 for the high-frequency band of this first set of equations are:

$L1 = Y + C + S + H$ $L2 = Y - C + S - H$ $L3 = Y - C - S + H$ $L4 = Y + C - S - H$

It will be noted that in this first set of equations for a down pattern, the sidepanel S component is polarity-modulated with polarity code (a) and the enhanced-luma H component is polarity-modulated with polarity code (c).

In a second set of equations for L1, L2, L3 and L4 for the down pattern, the sidepanel S component is polarity-modulated with polarity code (c) and the enhanced-luma H component is polarity-modulated with polarity code (a). Specifically, L1, L2, L3 and L4 of the mid-frequency band of the second set of equations for the down quad are:

$L1 = Ya + C + S$ $L2 = Ya - C - S$ $L3 = Yb - C + S$ $L4 = Yb + C - S$

Therefore, L1, L2, L3 and L4 for the high-frequency band of the second set of equations of the down pattern are:

$L1 = Y + C + S + H$ $L2 = Y - C - S - H$ $L3 = Y - C + S - H$ $L4 = Y + C - S + H$

The respective values of L1, L2, L3 and L4 for the low-band of both the first and second sets of equations of the down pattern are identical to those described above for the up pattern.

The mid-band frequency luma component value Ya and Yb are two computed values derived by intraframe averager 316. Usually Ya is a mean average or other averaging function of Y1 and Y2 of each successive ordinally-arranged luma quad, and Yb is usually the mean average or other averaging function of Y3 and Y4 of each successive ordinally-arranged luma quad. However, in principal, this need not be the case. For example, Ya could be the mean average of Y1 and Y3 and Yb could be the mean average of Y2 and Y4 (which amounts to extra-frame averaging), but with Ya still being derived in the Y2 ordinal position within a luma quad, and with Yb still being derived in the Y3 ordinal position in a luma quad. This would be equivalent to a swapping lines L2 and L3 in the first set of the down pattern.

Line-swapping is a tempting approach, especially when motion- adaptation becomes important, because re-arranging values of +C's and −C's would cause grossly incorrect colors, while swapping temporarily adjacent lines is relatively benign. However, this line-swapping technique has inherent difficulties when only a portion of the band is swapped. Because of non-ideal horizontal filtering around the 1.8 MHz point, some signal elements in the transition band will not be correctly swapped back into place by the widescreen enhanced-definition television receiver, while some that should not be swapped will be swapped by the receiver. If one could lower the frequency from 1.8 MHz all the way to zero, the line-swapping technique would work for the widescreen receiver, but, even then a standard NTSC receiver display would look terrible whenever something in the displayed picture moves.

It has been found that a desirable way to provide for motion adaptation in the computation of respective luma values for Ya and Yb in intra-frame averager 316 is to employ the following averaging functions:

$$Ya = K(Y1+Y2)/2 + (1-K)(Y1)$$

$$Yb = K(Y3+Y4)/2 + (1-K)(Y4)$$

where K is a motion-indicating factor having a fractional value between zero and unity, in which zero represents absence of motion in the temporal dimension and unity represent maximum motion in the temporal dimension.

Motion detector 322, which is responsive to the four independent values Y1, Y2, Y3 and Y4 of each ordinally-arranged quad of the low-frequency luma component, computes the value of the motion-indicating factor K in accordance with the following equations:

$$\Delta T = |(Y1+Y2)-(Y3+Y4)|$$

$$\Delta V = |(Y1+Y3)-(Y2+Y4)|$$

and $$K = \Delta T/(\Delta T + \Delta V)$$

A widescreen enhanced-definition television receiver includes a quadruplex decoder for separating the 4.2 MHz baseband signal comprised of successive composite quads back into its constituent components. The quadruplex decoder shown in FIG. 4 cooperates with the quadruplex encoder shown in FIG. 3.

Referring to FIG. 4, bandsplit filter 400 splits the successive composite quads of the baseband signal applied as an input thereto into first and second frequency bands respectively below and above 2.0 MHz. The 2.0 MHz employed by bandsplit filter 400 provides a 0.2 MHz guard band with respect to the 1.8 MHz employed by bandsplit filter 314 of the quadruplex encoder of FIG. 3. This guard band is desirable, although not essential, because it guards against crosstalk in the horizontal dimension of the image display.

The low-frequency first band is applied as an input to motion detector 402 and is also applied as one input to adder means 404. The second frequency band from filter 400 is applied as an input to first matrix means 406. First matrix means 406, described below, which operates on the frequency band of each successive composite quad extending from 2.0 to 4.2 MHz, derives Y, chroma C and sidepanel S and H' outputs. The H' output includes the enhanced-luma H component in the high-frequency band above 3.0 MHz and also includes a luma-difference component proportional to the difference between Ya and Yb in the mid-frequency band below 3.0 MHz. Bandsplit filter 408, which splits the H' output into third and fourth bands respectively below and above 3.0 MHz, separates the enhanced-luma H component in the high-frequency fourth band from the luma-difference component in the mid-frequency third band. This luma-difference component from bandsplit filter 408 and the luma component from first matrix means 406 are applied as respective first and second inputs to second matrix means 410, described below. The output from second matrix means 410 is applied as a first input to motion decoder 412, which has the motion-indicating factor K applied as a second input thereto from motion detector 402. The output from motion decoder 412 is applied as a second separate input to adder means 404. The output from adder means 404 comprises the luma component over its entire 4.2 MHz baseband frequency range.

First matrix means 406, which is preferably implemented in digital form, comprises memory delay means sufficient to permit the respective values of L1, L2, L3 and L4 of each successive composite quad applied as an input thereto to be derived simultaneously. This permits the matrixing of the four respective values of L1, L2, L3 and L4 as a predetermined algebraic sum thereof. Matrix means 406 includes two such matrices, one for resolving the value of the chroma C component and another for resolving the value of the sidepanel S component of each successive composite quad. The resolved chroma C and sidepanel S components are then applied as respective outputs from first matrix means 406 to appropriate chroma-carrier and sidepanel-carrier decoders.

The Y and H' components are not resolved by first matrix means 406. Specifically, both the Y and H' outputs from first matrix means 406 are still comprised of the four separate values L1, L2, L3 and L4 from each successive composite quad. However, in the case of the Y component output, all the four separate values have the same polarity as one another; while, in the case of the H' output, the four separate values have a set of predetermined polarities which are not the same as one another. The luma-difference component, applied as the first input to second matrix means 410, has the same predetermined polarities as the H' output from first matrix means 406.

The Y input to second matrix means 410 is proportional to a fully quad-averaged value of Y in both the mid-frequency band and the high-frequency band, while the luma-differnce input to second matrix means 410 is proportional to the difference of Ya−Yb in only the mid-frequency band. Second matrix means 410 includes first and second matrices, both of which are responsive to the luma-difference (Ya−Yb) and Y inputs applied thereto, for respectively resolving the value Ya in the first matrix and resolving the value of Yb in the second matrix. Further, second means 410 includes an appropriate memory or delay means for restoring the relative position of the restored values of Ya and Yb, respectively, to the first and to the second image frames of each successive quad. Therefore, the output from second matrix means 410 is comprised of respective values of Ya and Yb in the mid-frequency band of the luma component and a fully quad-averaged value of Y in the high-frequency band of the luma component.

In the previous discussion, it was stated that the chroma C and sidepanel S outputs from first matrix means 406 are each a predetermined algebraic sum of the respective values of L1, L2, L3 and L4, and that the H' output is comprised of four values of L1, L2, L3 and L4 having predetermined polarities. Both the predetermined algebraic sums of the chroma C and sidepanel S outputs and the predetermined polarities of the H' output depend upon whether the decoding of each successive composite quad by the quadruplex encoder of FIG. 3 employed an up-pattern, a first down-pattern or a second down-pattern. More specifically, in case of an up-pattern, the predetermined algebraic sums for C and S and the relationships for Y and H' are:

$$4C = L1 + L2 - L3 - L4$$

$$4S = L1 - L2 - L3 + L4$$

$$4Y = L1 + L2 + L3 + L4$$

$$4H' = L1 - L2 + L3 - L4$$

In the case of the down-pattern:

$$4C = L1 - L2 - L3 + L4$$

$$4S = L1 + L2 - L3 - L4$$

$$4Y = L1 + L2 + L3 + L4$$

$$4H' = L1 - L2 + L3 - L4$$

In the case the second down-pattern:

$$4C = L1 - L2 - L3 + L4$$

$$4S = L1 - L2 + L3 - L4$$

$$4Y = L1 + L2 + L3 + L4$$

$$4H' = L1 - L2 - L3 + L4$$

It is apparent that the mid-frequency band portion of the fully quad-averaged 4 Y signal is equal to the sum of 2 Ya and 2 Yb, while the mid-frequency band portion of the 4 H' signal is equal to the difference between 2 Ya and 2 Yb. Therefore second matrix means 410, by appropriately adding and subtracting the first and second inputs thereto, is able to solve the simultaneous equations to thereby resolve the respective values of Ya and Yb. The addition and subtraction can take place in many different ways. In general, the resolved values of Ya and Yb will not occur in the proper ordinal positions within a quad. Therefore, in general, second matrix means 410 requires memory means or delay means for restoring the resolved values of Ya and Yb to their respective proper positions within a quad, as discussed above in the description of second matrix means 410. However, the need for such memory or delay means in second matrix 410 can be eliminated by adhering to the following approach for combining the respective first and second inputs to second matrix means 410. First, the algebraic sum of the values of L1, L2, L3 and L4 comprising the luma-difference (Ya−Yb) input to second matrix means 410 is computed. Then, the value of this computed algebraic sum is added to each of those two values L1, L2, L3 and L4 of the Y input to second matrix means 410 which are associated with positive polarity L1, L2, L3 and L4 values of H', and is subtracted from each of the two remaining L1, L2, L3 and L4 values of the Y input to second matrix means 410. This results in each of Ya and Yb being restored to their proper ordinal positions in a luma quad without requiring additional memory or delay means.

Each successive quad of the low-frequency first band from filter 400 is comprised of four independent luma-component values in this low-frequency band. Motion detector 402, which is identical in structure and function to motion detector 322 described above, derives the motion-indicating factor K applied to motion decoder 412. Motion decoder 412 converts the respective the values of Ya and Yb into a luma quad comprised of ordinally-arranged luma values Y1', Y2', Y3', and Y4', wherein:

$$Y1' = Ya$$

$$Y2' = KYa + (1 - K)Yb$$

$$Y3' = KYb + (1 - K) Ya$$

$$Y4' = Yb$$

It should be understood that adder means 404 may contain any delay means required to insure that the corresponding quad values of its two inputs occur in time coincidence with one another when they are added together.

The high-frequency fourth band output from filter 408, which is comprised of the enhanced-luma H modulated-carrier component, is applied to an appropriate H decoder.

Referring to FIG. 5, there is shown an alternative embodiment of the quadruplex encoder. In FIG. 5, blocks 500, 502, 504, 506, 510, 512, 514, 516, 518 and 520, respectively, are structurally and functionally equivalent to corresponding blocks 300, 302, 304, 306, 310, 312, 314, 316, 318 and 320, respectively, of FIG. 3, described above. Further, although FIG. 5 does not show a motion detector, motion adaptation similar to that described in connection with FIG. 3 could be employed in FIG. 5, if desired.

The only significant difference between the respective embodiments of the quadruplex encoder shown in FIGS. 3 and 5 is the way that the enhanced-luma component is handled. In the embodiment of FIG. 5, the luma component input to bandsplit filter 514 is a baseband signal which includes an enhanced-luma band extending from 4.2 to 5.2 MHz, rather that extending only to 4.2 MHz. This differs from the FIG. 3 encoder embodiment, wherein the enhanced-luma component is a separate modulated carrier and the baseband luma component extends only to 4.2 MHz.

In the quadruplex encoder embodiment of FIG. 5, the high-frequency fourth band luma output from extra-frame averager 520 is supplied as an input to low-pass filter 524 having a 5.2 MHz cut-off frequency. The output from low-pass filter 524 is applied as one input to frequency converter 526. This first input to frequency converter 526 is comprised of both the high-frequency band of the regular luma component extending from 3.0 to 4.2 MHz and the enhanced-luma component extending from 4.2 to 5.2 MHz. An 8.4 MHz continuous-wave folding-carrier, after being polarity-modulated by enhanced-luma polarity modulator 512, is applied as a second input to frequency converter 526. Frequency converter 526 is designed to pass to its output only frequencies up to 4.2 MHz and reject from its output all frequency above 4.2 MHz. Thus, the output from frequency converter 526 will include both the high-frequency band portion of the regular luma component extending from 3.0 to 4.2 MHz applied to its first input, which is forwarded directly without frequency conversion to its output, and the polarity-modulated, frequency-converted enhanced-luma component, which now occupies a frequency band extending from 3.2 to 4.2 MHz in the output from frequency converter 526. This output from frequency converter 526 is applied as one of the separate inputs to adder means 504. Therefore, just as in the quadruplex encoder embodiment of FIG. 3, the output from adder means 504 is a 4.2 MHz baseband signal comprised of successive composite quads.

The quadruplex decoder shown in FIG. 6 cooperates with the quadruplex encoder shown in FIG. 5. In FIG. 6, each of blocks 600, 604, 606, 608 and 610, respectively, are similar in structure and function to corresponding blocks 400, 404, 406, 408 and 410 of FIG. 4. Further, while no motion detector or motion decoder are shown in FIG. 6, if the quadruplex encoder of FIG. 5 employs motion adaptation, a motion detector and motion decoder corresponding respectively to motion detector 402 and 412 would be employed in the quadruplex decoder of FIG. 6.

In FIG. 6, the high-frequency fourth band output from filter 608 is applied as a first input to frequency converter 614 and an 8.4 MHz continuous-wave unfolding carrier is applied as a second input to frequency converter 614. Frequency converter 614 is designed to pass to its output all frequencies up 5.2 MHz and to reject all frequencies above 5.2 MHz. The frequency band between 3.0 and 4.2 MHz applied to the first input of frequency converter 614 includes the 3.2 to 4.2 MHz band occupied by the quadruplex-encoded enhanced-luma component. After being frequency converted by the 8.4 MHz unfolding carrier, the enhanced-luma component will be restored to it original 4.2 to 5.2 MHz band in the output from frequency converter 6.14. This output from frequency converter 614 is applied as one the separate inputs to adder means 604. Thus, the output from adder means 604 will be a luma baseband signal extending up to 5.2 MHz.

In the description of the quadruplex encoders of FIGS. 3 and 5 and the quadruplex decoders of FIGS. 4 and 6, it was assumed for illustrative purposes that the vertical-temporal plane was organized into quads, such as chroma quads 200a and 200b, comprised of a single scan line from each of the four consecutive fields of a color frame. However, it is apparent that the vertical-temporal plane may be organized into quads, such as chroma quads 204a and 206a, comprised of two consecutive scan lines from each of the two interlaced fields making up each of the two images frames of a color frame. In this latter case, each of the quad averagers of the quadruplex encoders of FIGS. 3 and 5 would be organized to average the four correlated image values which correspond to each of these latter quads. However, it is apparent from FIG. 2 that, in this latter case, the respective polarities of these image values of the second frame of a color frame are inverted with respect to the polarities of the first image frame of a color frame. Therefore, for this second frame of a color frame, the proper alternative specified one of the three polarity codes (a), (b) (c), set forth above, should be employed. Further, intra-frame averaging in this latter case need not be motion-adapted, since the image information is updated every image frame. Further, the intra-frame averager of a quadruplex encoder, in this latter case, will be employed to intra-frame average either the correlated luma-component image values of each pair of corresponding scan lines of the two fields of an image frame, or, instead, the two correlated image values of each pair of consecutive scan lines of each of the two interlaced fields of an image frame.

In general, polarity codes may be used to provide $2^n$ independent values, in a manner which permits these independent values to be decoded without any resulting crosstalk therebetween. In the case of the quadruplex encoders and decoders disclosed herein, the value of n happens to be equal to two. However, the principles of the present invention could be extended to cases in which the value of n is greater than two.

Further, the principles of the present invention may be applied to signals other than a television-type signal, although the present invention is particularly suitable for use with a television-type signal.

What is claimed is:

1. A quadruplex encoder for multiplexing components of a television-type signal that includes a luma component, a chroma component and at least one additional component; said encoder comprising:

first means for converting said signal into successive sets of four ordinally-arranged information quads, each of said quads being comprised of up to four separate values including a single chroma-component value, at least one luma-component value, and one value for each additional component included in a quad;

second means for polarity-modulating the respective values of said chroma component of the four ordinally-arranged quads of each successive set with a first specified one of the following three polarity codes having relative polarities of (a) + + − − or, alternatively, − − + +, (b) + − − + or, alternatively, − + + −, and (c) + − + − or, alternatively, − + − +, respectively;

third means for polarity-modulating the respective values of said one additional component of the four ordinally-arranged quads of each successive set with a second specified one of said three codes (a), (b) and (c), respectively;

the respective values of said one luma component of the four ordinally-arranged quads of each successive set all having the same polarity, whereby in effect said respective values of said one luma component are polarity-modulated with a fourth polarity code having relative polarities of (d) + + + + or, alternatively, − − − −; and fourth means for separately summing in order the polarity-modulated values of said luma, chroma, and additional components included in a quad of the respective first, second, third and fourth of said four ordinally-arranged quads of each successive set and deriving successive composite quads each of which is comprised of the resulting respective four ordinally-arranged summation values of that set.

2. The quadruplex encoder defined in claim 1, wherein:
said first specified one of said three codes is a certain one of codes (a), (b) and (c), and said four summation values are arranged in such order in each successive composite quad that said certain one of said codes inherently provides a relationship between chroma-component and luma-component polarities which conforms to the NTSC standard.

3. The quadruplex encoder defined in claim 2, wherein said television type signal also includes another additional component; and wherein said encoder further comprises:
fifth means for polarity-modulating the respective values of said other additional component of the four ordinally-arranged quads of each successive set with a third specified one of said three codes (a), (b) and (c), respectively.

4. The quadruplex encoder defined in claim 3, wherein said first means comprises:
separate sixth means for averaging four correlated image values of each of said signal's luma component, chroma component, and two additional components, respectively, to derive a single average value for each of these four components, each of said four ordinally-arranged quads of a set being comprised of the respective single average values of these four components.

5. The quadruplex encoder defined in claim 4, wherein:
said successive sets are comprised of successive sets in the vertical-temporal image plane; and
said separate sixth means averages four correlated image values of each of said signal's luma component, chroma component, and two additional components, respectively, in the vertical-temporal image plane.

6. The quadruplex encoder defined in claim 5, wherein:
said signal is comprised of successive television frames of image information, and each of said frames is comprised of two interlaced television fields;
said four correlated image values of each of said four components in said vertical-temporal plane are derived from a single image line from each of four consecutive interlaced fields; and
said certain one of said polarity codes is that one of the polarity codes (a) and (b) which conforms in said vertical-temporal plane to the color-component polarities of a television signal in accordance with the NTSC standard.

7. The quadruplex encoder defined in claim 5, wherein:
said signal is comprised of successive television frames of image information, and each of said frames is comprised of two interlaced television fields;
said four correlated image values of each of said four components in said. vertical-temporal plane are derived from two consecutive image lines from each of the two interlaced fields; and
said certain one of said polarity codes is polarity code (c) which conforms in said vertical-temporal plane to the chroma-component polarities of a television signal in accordance with the NTSC standard.

8. The quadruplex encoder defined in claim 2, wherein:
said first means converts said signal into successive sets of ordinally-arranged information quads, each of said quads being comprised of four separate values including a single chroma-component value, two luma-component values, and one value for said one additional component;
a first of said two luma-component values being associated with a given pair of two quads of the four ordinally-arranged quads of each successive set which are modulated oppositely in polarity by said first specified one of said three polarity codes; and
a second of said two luma-component values being associated with the remaining pair of two quads of the four ordinally-arranged quads of each successive set which are modulated oppositely in polarity by said first specified one of said three polarity codes.

9. The quadruplex encoder defined in claim 8, wherein said first means comprises:
separate fifth means for averaging four correlated image values of each of said signal's chroma component and said one additional components, respectively, to derive a single average value for each of these two components, each of said quads being comprised of the respective single average values of these two components; and
sixth means for (1) deriving said first of said two lumacomponent values as a first given function of up to four correlated image values of said signal's luma component, and (2) deriving said second of said two luma-component values as a second given function of up to four correlated image values of said signal's luma component.

10. The quadruplex encoder defined in claim 9, wherein:
said separate fifth means averages four correlated image values of each of said signal's chroma component and said one additional component, respectively, in the vertical-temporal image plane; and
said sixth means (1) derives said first of said two luma-component values as a first given function of up to four correlated image values of said signal's luma component in the vertical-temporal image plane, and (2) derives said second of said two luma-component values as a second given function of up to four correlated image values of said signal's luma component in the vertical-temporal image plane.

11. The quadruplex encoder defined in claim 10, wherein:
said signal is comprised of successive television frames of image information, and each of said frames is comprised of two interlaced television fields;
said four correlated image values of each of said chroma and said one additional components in said vertical-temporal plane are derived from a single image line from each of the two interlaced fields comprising each of two consecutive frames;
said first given function comprises averaging two correlated image values derived from a single image line from each of the two fields of a first of two consecutive frames;
said second given function comprises averaging two correlated image values derived from a single image line from each of the two fields of a second of said two consecutive frames; and said certain one of said polarity codes conforms in said vertical-temporal plane to the color-component polarities of a television signal in accordance with the NTSC standard.

12. The quaduplex encoder defined in claim 10, wherein:
said encoder is responsive to an applied motion signal K having a value in a range between zero for no image motion and unity for maximum image motion;

said television-type signal is comprised of successive television frames of image information, and each of said frames is comprised of two interlaced television fields;

said four correlated image values of each of said chroma and said one additional components in said vertical-temporal plane are derived from a single image line from each of the two interlaced fields comprising each of two consecutive frames;

said first given function is $Ya = K(Y1+Y2)/2 + (1-K)(Y1)$, where Ya is the first of said two luma component values, and Y1 and Y2, respectively, are two correlated image values derived respectively from a single image line from the first and from the second of the two fields of a first of two consecutive frames, and K is a motion-indicating factor having a value between zero and unity, with zero being indicative of no image motion in the image temporal dimension and with unity being indicative of maximum image motion in the image temporal dimension;

said second given function is $Yb = K(Y3+Y4)/2 + (1-K)(Y4)$, where Yb is the second of said two luma component values, and Y3 and Y4, respectively, are two correlated image values derived respectively from a single image line from the first and from the second of the two fields of a second of two consecutive frames; and said certain one of said polarity codes conforms in said vertical-temporal plane to the color-component polarities of a television signal in accordance with the NTSC standard.

13. The quadruplex encoder defined in claim 10, wherein:
said signal is comprised of successive television frames of image information, and each of said frames is comprised of two interlaced television fields; and and said four correlated image values of each of said chroma and said one additional components in said vertical-temporal plane are derived from two consecutive image lines from each of the two interlaced fields comprising each single frame; and said first given function comprises averaging two correlated image values derived from two consecutive image lines from a first of the two interlaced fields comprising each single frame;

said second given function comprises averaging two correlated image values derived from two consecutive image lines from a second of the two interlaced fields comprising each single frame; and said certain one of said polarity codes conforms in said vertical-temporal plane to the color-component polarities of a television signal in accordance with the NTSC standard.

14. A quadruplex decoder for demultiplexing a quadruplexed-encoded television-type signal comprised of successive composite quads with each composite quad being comprised of four ordinally-arranged values, each of said four ordinally-arranged values of a composite quad including a different predetermined algebraic sum of a luma-component value, a chroma-component value, and a value of at least one additional-component; wherein the value of the chroma-component contribution to all four ordinally-arranged values of a composite quad is the same but the polarity of said chroma-component contribution to a composite quad varies in accordance with the order of a first specified one of the following three polarity codes having relative polarities of (a) $++--$ or, alternatively, $--++$, (b) $+--+$ or, alternatively, $-++-$, and (c) $+-+-$ or, alternatively, $-+-+$, respectively; the value of said one additional-component contribution to all four values of a composite quad is the same but the polarity of said one additional-component contribution varies in accordance with the order of a second specified one of said three codes (a), (b) and (c), respectively; and said luma-component has no more than two separate values, with one of said two separate luma-component values contributing to those two of the four values of a composite quad which are associated with one polarity of a certain one of said first and second specified codes and the other of said two separate luma-component values contributing to the remaining two of the four values of a composite quad which are associated with the opposite polarity of said certain one of said first and second specified codes, the polarities of said luma-component contribution to all four values of a composite quad being in accordance with the order of a fourth polarity code having relative polarities of (d) $++++$ or, alternatively, $----$; said decoder comprising:

first means including at least one matrix means responsive to each of said successive composite quads being supplied thereto, said matrix means resolving said four values of a composite quad into said components thereof, said matrix means deriving up to four separate outputs, said separate outputs including at least an output substantially proportional to the value of that composite quad's chroma component, an output substantially proportional to the value of that composite quad's one additional component, and an output substantially proportional to one value of that composite quad's luma component; and second means for supplying successive composite quads to said first means.

15. The quadruplex decoder defined in claim 14, wherein:
said first specified one of said three codes is a certain one of codes (a), (b), and (c), and said four ordinally-arranged values of each successive composite quad are arranged in such order that said certain one of said codes inherently provides a relationship between chroma-component and luma-component polarities which conforms to the NTSC standard.

16. The quadruplex decoder defined in claim 15, wherein each of said four composite values includes a different predetermined algebraic sum of a luma-component value, a chroma-component value, a value of said one additional-component, and a value of said other additional-component; the value of said other additional component contribution to all four ordinally-arranged composite values is the same but the polarity thereof varies in accordance with a third specified one of said three codes (a), (b) and (c), respectively; and the value of said luma component contribution to all four ordinally-arranged composite values is the same; and wherein:

said matrix means derives a separate output substantially proportional to said other additional component;

whereby said luma-component value, chroma-component value, one additional-component value and other additional-component value respectively provided by said four separate outputs from said matrix means may be utilized to derive an enhanced television display.

17. The quadruplex decoder defined in claim 15, wherein said luma component has said two separate values ; and wherein:

said first means derives one separate output substantially proportional to said one of said two separate luma-component values, and another separate output substantially proportional to said other of said two separate luma-component values;

whereby said two separate luma-component values; chroma-component value and one additional-component value, respectively, provided by said four separate outputs from said matrix means may be utilized to derive an enhanced television display.

18. The quadruplex decoder defined in claim 17 further comprising:

a motion decoder responsive to said two separate luma-component values and a motion-indicating factor K having a value between zero and unity, with zero being indicative of no image motion in the image temporal dimension and with unity being indicative of maximum image motion in the image temporal dimension, said motion decoder converting said two separate luma-component values into four ordinally-arranged image values of each successive quad of said luma component in accordance with each of the four respective relationships $Y1'=Ya$, $Y2'=KYa+(1-K)Yb$, $Y3'=KYb+(1-K)Ya$, and $Y4'=Yb$, where $Y1'$, $Y2'$, $Y3'$ and $Y4'$ are said four ordinally-arranged image values, and Ya and Yb are, respectively, the first and second of said two separate luma-component values.

19. In a single channel NTSC compatible widescreen enhanced-definition television system for deriving a 4.2 MHz baseband signal which contains NTSC compatible luma and chroma-modulated-carrier components and also contains a sidepanel component and a component defining enhanced-luma information in a frequency band above 4.2 MHz; the combination comprising:

luma means responsive to successive interlaced television fields of luma information supplied thereto; chroma means responsive to successive interlaced television fields of chroma-modulated carrier information supplied thereto; sidepanel means responsive to successive interlaced television fields of sidepanel-modulated carrier information supplied thereto; enhanced-luma means responsive to successive interlaced television fields of enhanced-luma information supplied thereto; and adder means for summing a plurality of inputs applied thereto; wherein both said chroma-modulated carrier information and said sidepanel-modulated carrier information within each field conforms to the NTSC standard but successive fields differ from the NTSC standard by having the same relative polarity as one another;

said luma means being comprised of first filter means for splitting said luma information into first and second bands which are respectively below and above a first frequency, means including second filter means and first vertical-temporal averaging means for splitting said second luma-information band into third and fourth bands which are respectively below and above a second frequency higher than said first frequency, said first averaging means substituting in said third band, for each of two correlated vertical-temporal image values from each single pair of consecutive fields of luma information, an average value determined in accordance with a given averaging function of said two correlated vertical-temporal image values, said first averaging means substituting in said fourth band, for each four correlated vertical-temporal image values of each of successive vertical-temporal luma quads comprised of no more than two consecutive pairs of consecutive fields of luma information, the mean value of said four correlated vertical-temporal image values; and respective means for applying each of said first, third and fourth bands of luma information as inputs to said adder means;

said chroma means comprising second vertical-temporal averaging means for substituting, for each of four vertical-temporal correlated image values of successive chroma vertical-temporal quads of said chroma-modulated carrier information, the mean value of these four correlated image values, each successive chroma quad corresponding to a luma quad and being comprised of four correlated image values from no more than two consecutive pairs of consecutive fields; means for polarity-modulating the four respective mean values of each substitute chroma quad with a certain one of polarity codes (a), (b), and (c) of the following three polarity codes having relative polarities of (a) $+ + - -$ or, alternatively, $- - + +$, (b) $+ - - +$ or, alternatively, $- + + -$, and (c) $+ - + -$ or, alternatively, $- + - +$, respectively, said same average values of said third band of said luma information being respectively associated with opposite polarities of said certain one of said polarity codes; and means for applying said successive polarity-modulated chroma quads as an input to said adder means;

said sidepanel means comprising third vertical-temporal averaging means for substituting, for each of four vertical-temporal correlated image values of successive vertical-temporal sidepanel quads of said sidepanel-modulated carrier information, the mean value of these four correlated image values, each successive sidepanel quad corresponding to a luma quad and being comprised of four correlated image values from no more than two consecutive pairs of consecutive fields; means for polarity-modulating the four respective mean values of each substitute sidepanel quad with a first specified one of said three polarity codes (a), (b) and (c) other than said certain one of said three polarity codes; and means for applying said successive polarity-modulated sidepanel quads as an input to said adder means; and said enhanced-luma means applying successive vertical-temporal enhanced-luma quads of said band of enhanced-luma information as an input to said adder means, each successive enhanced-luma quad corresponding to a luma quad and being comprised of the same four values each of which is the mean of four correlated image values of enhanced-luma information from no more than two consecutive pairs of consecutive fields, said same four mean values of an enhanced-luma quad being polarity-modulated by a second specified one of said three polarity codes (a), (b) and (c) other than said said certain one of said three polarity codes;

whereby the output from said adder means constitutes said 4.2 MHz baseband signal.

20. The system defined in claim 19, wherein:

the frequency width of said band of enhanced-luma information is less than the frequency difference between 4.2 MHz and said second frequency, and said luma information supplied to said luma means includes said band of enhanced-luma information extending above 4.2 MHz; and said enhanced-luma means comprises means for deriving an 8.4 MHz continuous-wave folding carrier that is polarity-modulated by said second specified one of said three polarity codes, and signal-translation means including a frequency converter incorporated in said means for applying said fourth band of luma information to said adder means, said frequency converter having said polarity-modulated folding carrier and said fourth band of luma information applied thereto for converting said band of enhanced-luma information to a frequency range between said second frequency and 4.2 MHz and polarity-modulating the converted band of enhanced-luma information with said second specified one of said three polarity codes.

21. The system defined in claim 20, wherein:

said first filter means splits said luma information into said first and second bands at a first frequency of the order of 1.8 MHz; and said second filter means splits said luma information into said third and fourth bands at a second frequency of the order of 3.0 MHz.

22. The system defined in claim 21, wherein:

said signal-translation means includes a low-pass filter for applying only frequencies up to 5.2 MHz of said fourth band to said frequency converter, whereby said polarity-modulated converted band of enhanced-luma information extends over a frequency range of 3.2 MHz to 4.2 MHz.

23. The system defined in claim 19, wherein said enhanced-luma information includes enhanced-luma-modulated carrier information which within each field conforms to the NTSC standard but successive fields differ from the NTSC standard by having the same relative polarity as one another; and wherein:

said enhanced-luma means comprises fourth vertical-temporal averaging means for substituting, for each of four vertical-temporal correlated image values of successive vertical-temporal enhanced-luma quads of said enhanced-luma-modulated carrier information, the mean value of these four correlated image values, each successive enhanced-luma quad corresponding to a luma quad and being comprised of four correlated image values from no more than two consecutive pairs of consecutive fields; means for polarity-modulating the four respective mean values of each substitute enhanced-luma quad with a second specified one of said three polarity codes (a), (b) and (c) other than said said certain one of said three polarity codes; and means for applying said successive polarity-modulated enhanced-luma quads as an input to said adder means.

24. The system defined in claim 23, wherein:

said first filter means splits said luma information into said first and second bands at a first frequency of the order of 1.8 MHz;

said second filter means splits said luma information into said third and fourth bands at a second frequency of the order of 3.0 MHz; and said component defines enhanced-luma information in a frequency band extending from 4.2 MHz to 5.2 MHz.

25. The system defined in claim 19, wherein:

said first vertical-temporal averaging means comprises means for intraframe averaging said second band of luma information in accordance with said given averaging function.

26. The system defined in claim 25 wherein:

said luma quad is comprised of four correlated image values from two consecutive television scanlines from each field of each single pair of consecutive fields;

said given averaging function derives a first mean value of a first of said two consecutive television scanlines from each field of each single pair of consecutive fields and a second mean value of a second of said two consecutive television scanlines from each field of each single pair of consecutive fields; and said first averaging means further includes means responsive to said fourth band of luma information for deriving the mean value for each of said successive luma quads as the mean average of said first and second mean values of each single pair of consecutive fields of that luma quad.

27. The system defined in claim 25 wherein:

said luma quad is comprised of four correlated image values from a single television scanline from each field of each two consecutive pairs of consecutive fields; and said first averaging means further includes means for extraframe averaging said fourth band of luma information for deriving the mean value for each of said successive luma quads as the mean average of the respective intraframe-averaged values of each of the two consecutive pairs of consecutive fields of that luma quad 28. The system defined in claim 26, wherein said given averaging function is such that:

$Ya = K(Y1=Y2)/2 + (1-K)(Y1)$, where Ya is the average value for a first of the two consecutive pairs of consecutive fields of a luma quad, and Y1 and Y2, respectively, are two correlated image values derived respectively from a single image line from the first and from the second of the two fields of the first of the two consecutive pairs of consecutive fields, and K is a motion-indicating factor having a value between zero and unity, with zero being indicative of no image motion in the image temporal dimension and with unity being indicative of maximum image motion in the image temporal dimension; and $Yb = K(Y3+Y4)/2 + (1-K)(Y4)$, where Yb is the average value for a second of the two consecutive pairs of consecutive fields of a luma quad, and Y3 and Y4, respectively, are two correlated image values derived respectively from a single image line from the first and from the second of the two fields of the second of the two consecutive pairs of consecutive fields.

29. The system defined in claim 27 further comprising: a motion detector responsive to each successive luma quad of said first band for computing a value for K for that luma quad in accordance with the respective relationships $\Delta T = |(Y1+Y2)-(Y3+Y4)|$, $\Delta V = |(Y1+Y3)-(Y2+Y4)|$, and $K = \Delta T/(\Delta T + \Delta V)$.

30. The system defined in claim 19, wherein: said second specified one of said three polarity codes is polarity code (c).

31. In a single channel NTSC compatible widescreen enhanced-definition television receiver responsive to a 4.2 MHz baseband signal which contains NTSC compatible luma and chroma-modulated-carrier components and also contains a sidepanel component and a component defining enhanced-luma information in a frequency band above 4.2 MHz; said baseband signal being comprised of a low frequency band below a first given frequency, a middle frequency band between said first given frequency and a second given frequency and a high band between said second given frequency and 4.2 MHZ; each of said low, middle and high frequency bands being comprised of successive composite quads in the vertical-temporal image plane, with each composite quad being comprised of four ordinally-arranged values; wherein (1) each of said four ordinally-arranged values of a composite quad of said high frequency band includes a different predetermined algebraic sum of a luma value, a chroma value, a sidepanel value and an enhanced-luma value, (2) each of said four ordinally-arranged values of a composite quad of said middle frequency band includes a different predetermined algebraic sum of up to two luma values, a chroma value and a sidepanel value, (3) each of said four ordinally-arranged values of a composite quad of said low frequency band includes a different predetermined algebraic sum of four luma values; wherein the value of the chroma contribution to all four ordinally-arranged values of a composite quad is the same but the polarity of said chroma contribution to a composite quad varies in accordance with the order of a certain one of polarity codes (a) and (b) of the following three polarity codes having relative polarities of (a) + + − − or, alternatively, − − + +, (b) + − − + or, alternatively, − + + −, and (c) + − + − or, alternatively, − + − +, respectively; wherein the value of said sidepanel contribution to all four values of a composite quad is the same but the polarity of said sidepanel contribution to a composite quad varies in accordance with the order of a first specified one of said three polarity codes (a), (b) and (c) other than said certain one of said three polarity codes; wherein the value of said enhanced-luma contribution to all four values of a composite quad is the same but the polarity of said enhanced-luma contribution to a composite quad varies in accordance with the order of a second specified one other than said certain one of said three codes (a), (b) and (c) said, respectively; and wherein the value of said high-band luma contribution to all four values of a composite quad is the same, each of the two separate values of the middle-band luma contribution to a composite quad is individually associated in that quad with a different given pair of two chroma contributions that have opposite polarities, and the polarity of the luma contribution to a composite quad is in accordance with the order of a fourth polarity code having relative polarities of (d) + + + + or, alternatively, − − − −; the combination comprising:

adder means for summing a plurality of inputs applied therto; and signal translation means including first filter means for splitting said baseband signal into first and second bands which are respectively below and above said first frequency, and second filter means for splitting said second band into third and fourth bands which are respectively below and above said second frequency, whereby said first band includes the values in said low band of said luma component;

said signal translation means further including matrix means responsive to successive composite quads of said second and third bands for separating said middle and high bands of said baseband signal into the values in said middle and high bands of said luma component, the values in said middle and high bands of said chroma component, of the values in said middle and high bands of said sidepanel component, and of the values in said high band of said enhanced-luma component; and means for applying said low band of said luma component as one input to said adder means, and means for applying said middle and high bands of said luma component as at least one other input to said adder means 32. The television receiver defined in claim 31, wherein said second specified one of said three polarity codes is polarity code (c), and wherein said translation means includes:

said matrix means including a first matrix for deriving a first output that includes the enhanced-luma values in said high band and the values of the difference between the two luma values in the middle band of the respective successive quads, a second matrix for deriving a second output that includes the luma values in said high band and the values of the sum of the two luma values in the middle band of the respective successive quads, a third matrix for deriving a third output that includes the chroma values in said middle and high bands of the respective successive quads, a fourth matrix for deriving a fourth output that includes the sidepanel values in said middle and high bands of the respective successive quads;

means for applying said first output of said first matrix means as said input to said second filter means, whereby the values of the difference between the two luma values of the respective successive quads are forwarded to said third band and the enhanced-luma values of the respective successive quads are forwarded to said fourth band; and said matrix means further including additional matrices responsive to said third band and to said second output from said second matrix for deriving a fifth output that includes the luma values in said middle and high bands in which the value of each of the two luma values in the middle band of each successive quad is resolved.

33. The television receiver defined in claim 32, wherein:

each of said successive composite quads corresponds in said vertical-temporal image plane to two consecutive scanlines from each field of a single pair of two consecutive interlaced fields of said baseband signal.

34. The television receiver defined in claim 32, wherein:

each of said successive composite quads corresponds in said vertical-temporal image plane to a single scanline from each field of two consecutive pairs of two consecutive interlaced fields of said baseband signal.

35. The television receiver defined in claim 34, wherein:

said means for applying said middle and high bands of said luma component to said adder means includes a motion decoder responsive to said two resolved luma values of said fifth output and to a motion-indicating factor K having a value between zero and unity, with zero being indicative of no image motion in the image temporal dimension and with unity being indicative of maximum image motion in the image temporal dimension, said motion decoder converting said two separate luma-component values into four ordinally-arranged image values of each successive quad of said luma component in accordance with each of the four respective relationships $Y1' = Ya$, $Y2' = KYa + (1-K)Yb$, $Y3' = KYb + (1-K)Ya$, and $Y4' = Yb$, where $Y1'$, $Y2'$, $Y3'$ and $Y4'$ are said four ordinally-arranged image values, and Ya and Yb are, respectively, the first and second of said two resolved luma values.

36. The television receiver defined in claim 35 wherein:

a motion detector responsive to each successive luma quad of said first band for computing a value for K for that luma quad in accordance with the respective relationships $\Delta T = |(Y1+Y2)-(Y3+Y4)|$, $\Delta V = |(Y1+Y3)-(Y2+Y4)|$, and $K = \Delta T/(\Delta T + \Delta V)$.

37. The television receiver defined in claim 31 wherein said sidepanel component is a carrier modulated by sidepanel information, and said enhanced-luma component is a carrier modulated by said band of enhanced-luma information.

38. The television receiver defined in claim 31 wherein said sidepanel component is a carrier modulated by sidepanel information, and the frequency width of said band of said enhanced-luma component is less than the frequency width of said third band between 4.2 MHz and said second frequency and said band of said enhanced-luma component is folded at 4.2 MHz into said third band; and wherein:

said means for applying middle and high band luma components as inputs to said adder means includes a frequency converter responsive to said fourth band and an applied 8.4 MHz continuous-wave unfolding carrier to derive a band of enhanced-luma information extending above 4.2 MHz; and said combination further includes means for applying said 8.4 MHz continuous-wave unfolding carrier to said frequency converter.

39. The television receiver defined in claim 38 wherein:

said first filter means splits said baseband signal into said first and second bands at a first frequency of the order of 1.8 MHz;

said second filter means splits second band into said third and fourth bands at a second frequency of the order of 3.0 MHz; and said enhanced-luma information derived from said frequency converter is in a frequency band extending from 4.2 MHz to 5.2 MHz.

* * * * *